United States Patent [19]
Kumar et al.

[11] Patent Number: 5,426,675
[45] Date of Patent: Jun. 20, 1995

[54] SELF-ALIGNING SEAL SYSTEM FOR MAINTENANCE SERVICE IN NUCLEAR REACTOR PRESSURE VESSELS

[75] Inventors: Kirti Kumar; Karl B. Larsen, both of San Jose, Calif.

[73] Assignee: General Electric Company, San Jose, Calif.

[21] Appl. No.: 786,460

[22] Filed: Nov. 1, 1991

[51] Int. Cl.⁶ .............................................. G21C 13/00
[52] U.S. Cl. .................................. 376/203; 376/260; 376/361; 376/370
[58] Field of Search ............... 376/203, 260, 370, 361, 376/205

[56] References Cited

U.S. PATENT DOCUMENTS

| | | | |
|---|---|---|---|
| 5,070,589 | 12/1991 | Howell et al. | 376/260 |
| 5,078,954 | 1/1992 | Smith et al. | 376/260 |
| 5,102,612 | 4/1992 | McDonald et al. | 376/203 |
| 5,104,611 | 4/1992 | Woods et al. | 376/203 |

*Primary Examiner*—Donald P. Walsh
*Assistant Examiner*—Frederick H. Voss
*Attorney, Agent, or Firm*—John S. Beulick

[57] ABSTRACT

A self-aligning seal system for use in carrying out maintenance services in a nuclear fission reactor plant is disclosed. The self-aligning seal system enables an operator to block off openings in the lower portion of a water filled reactor pressure vessel for maintenance service in an underlying dry field without draining the coolant water from the reactor pressure vessel.

5 Claims, 5 Drawing Sheets

FIG. 4
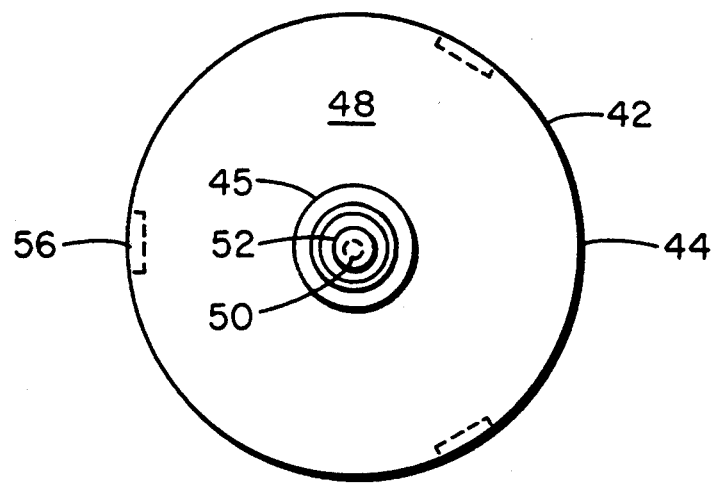
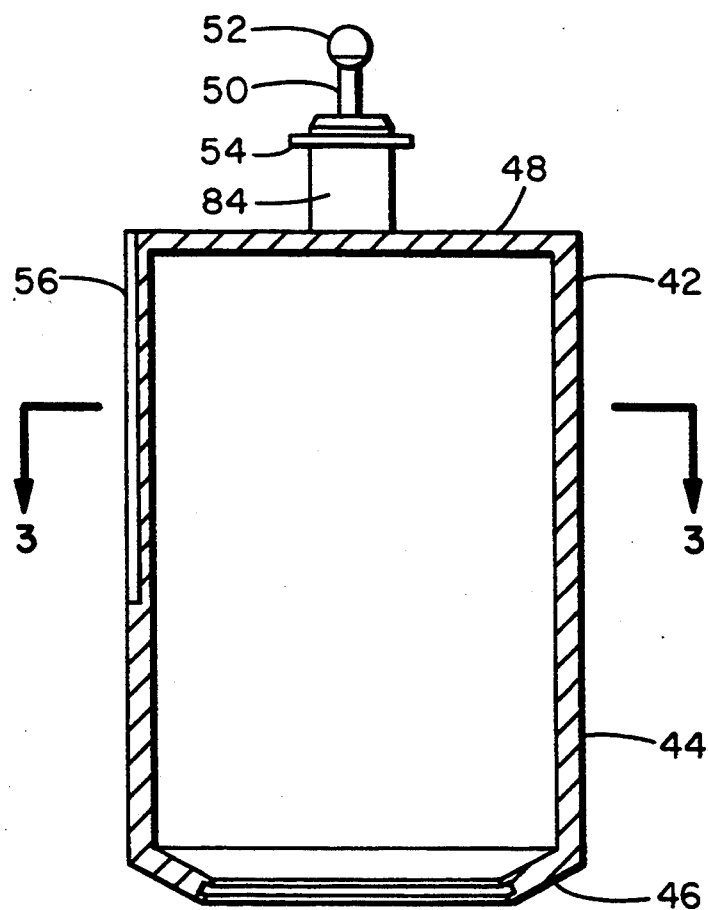
FIG. 3

SELF-ALIGNING SEAL SYSTEM FOR MAINTENANCE SERVICE IN NUCLEAR REACTOR PRESSURE VESSELS

FIELD OF THE INVENTION

This invention relates to means used in maintenance service of a type of coolant water circulating pumps in boiling water, nuclear fission reactor plants. The invention specifically comprises a self-aligning seal system used when repairing or replacing components associated with a given design of coolant water circulating pumps located in the bottom of the pressure vessel of a nuclear fission reactor plant.

BACKGROUND OF THE INVENTION

Some categories of water cooled and moderated nuclear fission reactor plants used for producing steam to generate electrical power, such as commercial boiling water reactors, utilize coolant water circulating pumps having drive motors located in casings outside of the reactor pressure vessel connected with pump impellers located within the reactor pressure vessel by means of drive shafts passing through the wall of the reactor pressure vessel. Thus, in nuclear fission reactor plants of this type, a number of internal impeller pumps driven by external electrical or other motors are positioned in the lower portion, or bottom of the reactor pressure vessel with each having a drive shaft extending through the wall of the coolant water containing reactor pressure vessel. This arrangement necessitates the requirement of a multiplicity of bore openings passing through the curved bottom portion of the reactor pressure vessel which contains a large volume, or head of circulating coolant water under high temperatures and pressure for submerging the fuel core and transferring heat away therefrom in producing steam for work.

The bore openings in the reactor pressure vessel for the entry of pump drive shafts are each formed with the vessel having a short, generally vertical tube-like section or hollow cylinder stub projecting vertically upward around the bore openings. In one design a hollow cylindrical housing supports the external drive motor casing and surrounds the drive shaft extending from the motor, and passing through the reactor pressure vessel wall with the drive shaft extending therefrom to the pump impeller for circulating coolant water with the pressure vessel. This hollow cylinder housing extends concentrically within the bore up into the pressure vessel tube section or hollow cylinder stub, and is thus secured such as by welding the upper annular end of the housing to the surrounding inside area of the bore opening tube section or hollow cylinder stub.

Due to the routine mechanical movement of such driven impeller pumps, including high speed rotation and inherent vibrations, which over a period of time can result in wear and metal stress and fatigue, components of this circulating system are periodically serviced and may be replaced to insure effective and safe operation of the nuclear reactor plants. Maintenance service of this nature may require replacement or repair welding of the hollow cylindrical housing unit which supports the drive motor housing and surrounds the pump drive shaft, and extends a distance concentrically into the pressure vessel bore opening tube section or stub.

Maintenance service of this circulating system, including either replacement or simply repair welding of portions such as the upper annular end of the hollow cylindrical housing unit and the encircling pressure vessel bore opening tube section or the weld between the two, must be carried out under the most cumbersome, and difficult circumstances. Namely, this maintenance undertaking need be performed within the lower portion of the reactor pressure vessel while retaining therein a substantial body of radioactive contaminated coolant water for covering and cooling the heat producing fissionable fuel core. Thus, the maintenance service, including repair welding of the upper annular end of the hollow cylindrical housing unit and the pressure vessel bore opening tube section or the weld between the two, must be carried out beneath a high head of water which is contaminated with radiation and wherein the reactor vessel coolant water cannot be permitted to escape through the pressure vessel bore opening tube section that provides entry up into the reactor pressure vessel and through which the coolant water circulating pump assembly is installed. Service operations under such stringent circumstances requires very complex procedures and special equipment and tools.

SUMMARY OF THE INVENTION

This invention comprises a unique self-aligning seal system for performing maintenance service on coolant water circulating pump motor casings attached to the bottom of a pressure vessel of a nuclear fission reactor plant, such as replacement or reconditioning of pump motor casing components or related parts. The self-aligning seal system provides means for closing off the pump penetration in the reactor pressure vessel from any flow or leakage of overhead coolant water contained within the reactor pressure vessel.

OBJECTS OF THE INVENTION

It is a primary object of this invention to provide a unique means for servicing coolant water circulating pump motor casing assemblies located in the lower most portion of a nuclear reactor pressure vessel.

It is also an object of this invention to provide a sealing means for use in maintenance service of components associated with coolant water circulating pump motor casing assemblies for nuclear reactors.

It is a further object of this invention to provide an improved self-aligning sealing system for use in servicing nuclear reactor pressure vessel coolant water circulating pump motor casings.

It is a still further object of this invention to provide a self-aligning seal system for maintenance service of coolant water circulating pump motor casing located external to the reactor pressure vessel with a drive shaft passing through the reactor pressure vessel to an internal pump impeller.

It is another object of this invention to provide a unique self-aligning seal system and means for closing off a tube-like section of a bore opening in the lower portion of a coolant water containing reactor pressure vessel for servicing components associated with a coolant water circulating pump assembly.

FIG. 3 comprises a partial sectional view of the cylindrical seal unit of this invention.

FIG. 4 comprises a cross-sectional view along line 3—3 of FIG. 3.

Figure 5:
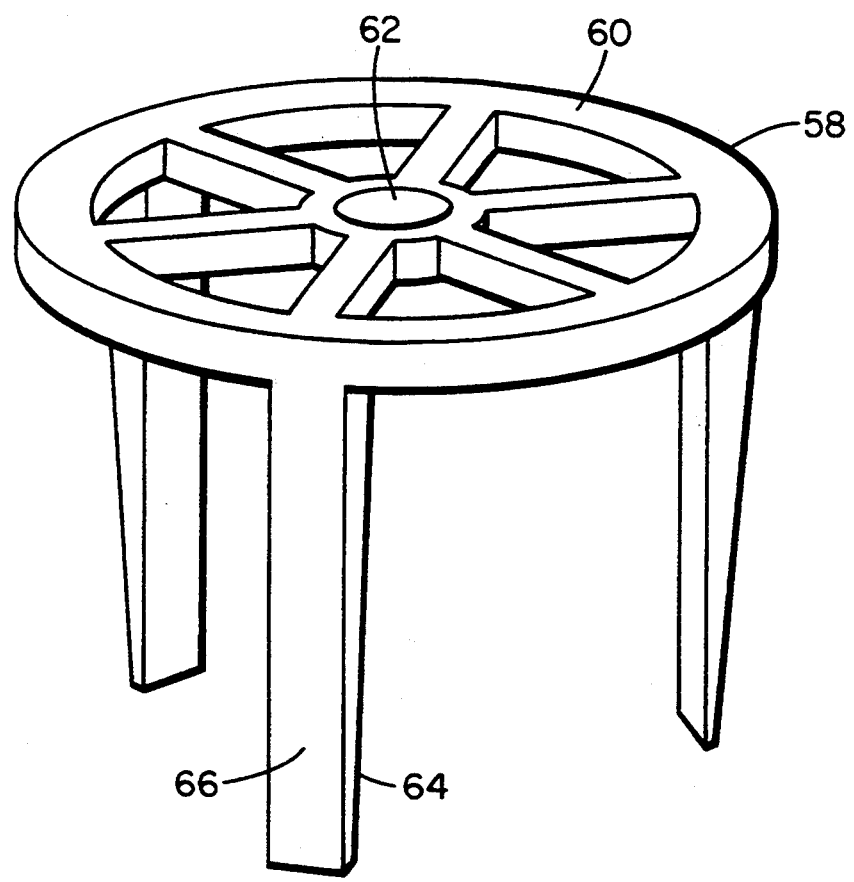

FIG. 5 comprises a perspective view of the seal guide member of this invention.

Figure 6:
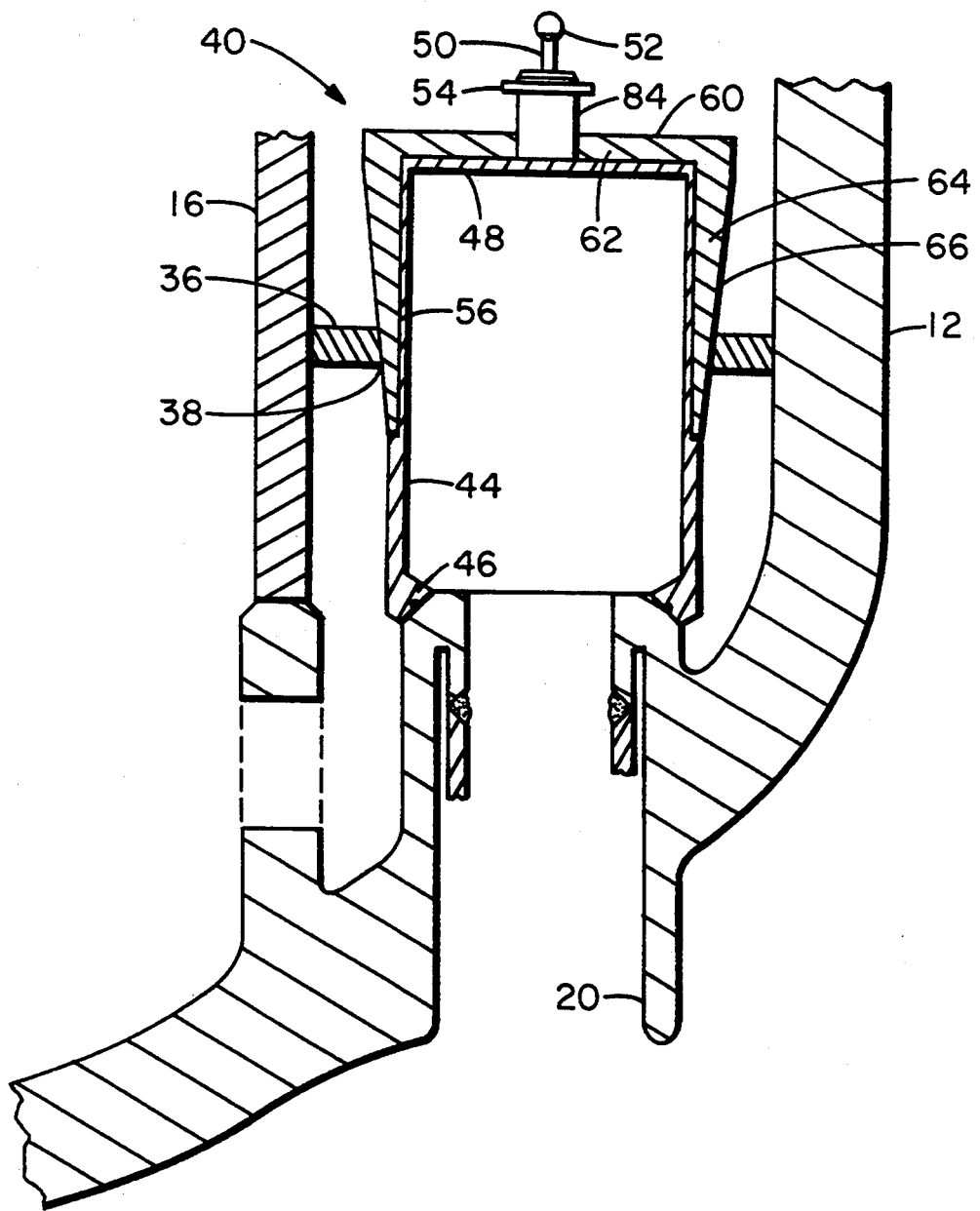

FIG. 6 comprises a partial sectional view of the self-aligning seal system of this invention installed within a portion of a nuclear reactor plant pressure vessel.

DETAILED DESCRIPTION OF THE INVENTION

Figure 1:
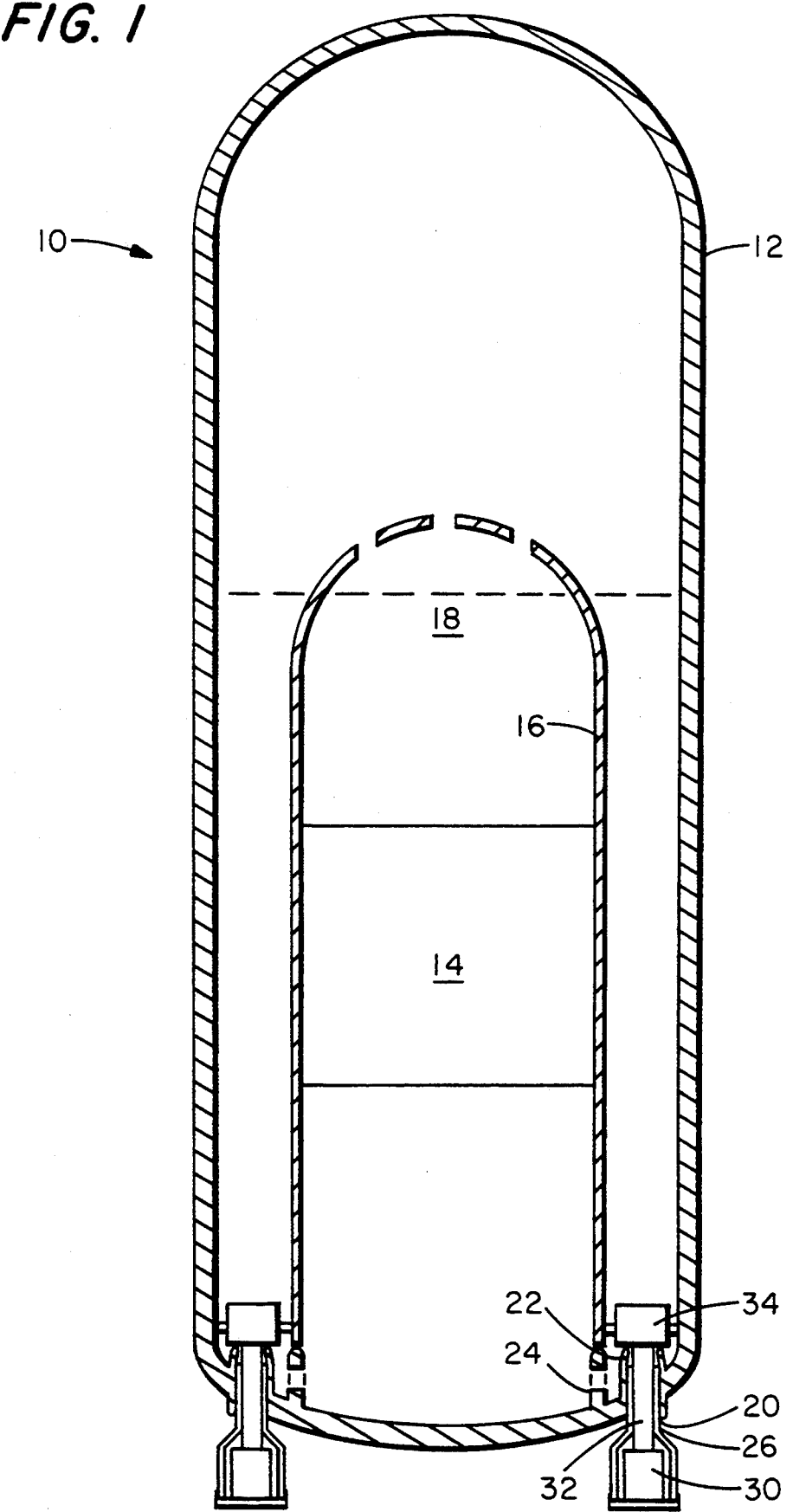
FIG. 1 comprises a sectional view of a nuclear reactor plant pressure vessel illustrating coolant water circulating pumps in the lower portion of the vessel.

Referring to the drawing, FIG. 1 in particular, a nuclear fission reactor plant 10 comprises a reactor pressure vessel 12 enclosing a core 14 of fissionable nuclear fuel which is surrounded by a fuel core shroud 16. Coolant water 18 covers the heat producing fuel core 14 and fills a substantial portion of the reactor pressure vessel 12. The coolant water 18 is circulated through the reactor plant to carry away heat produced by a fission reaction within the fuel core which forms steam from a portion of the coolant water to perform work such as drive a turbine for generating electrical power. The circulating coolant water 18 follows a repeating circuit of downward in an annular path in a downcomer between the pressure vessel 12 inside wall and the outside of the shroud 16 surrounding the fuel core 14, then around the bottom of shroud 16 through the shroud support 24 and up through the heat producing fuel core 14 where a portion of the coolant water is converted to steam that continues upward with liquid coolant water whereupon the steam is dispensed from the reactor pressure vessel to perform work. Coolant water not vaporized into steam on passing through the fuel core 14 continues upward with the vaporized steam through the shroud head and separators, then it reverses direction and again flows downward in the annular downcomer along with added condensate water from work expended and condensed steam.

Figure 2:
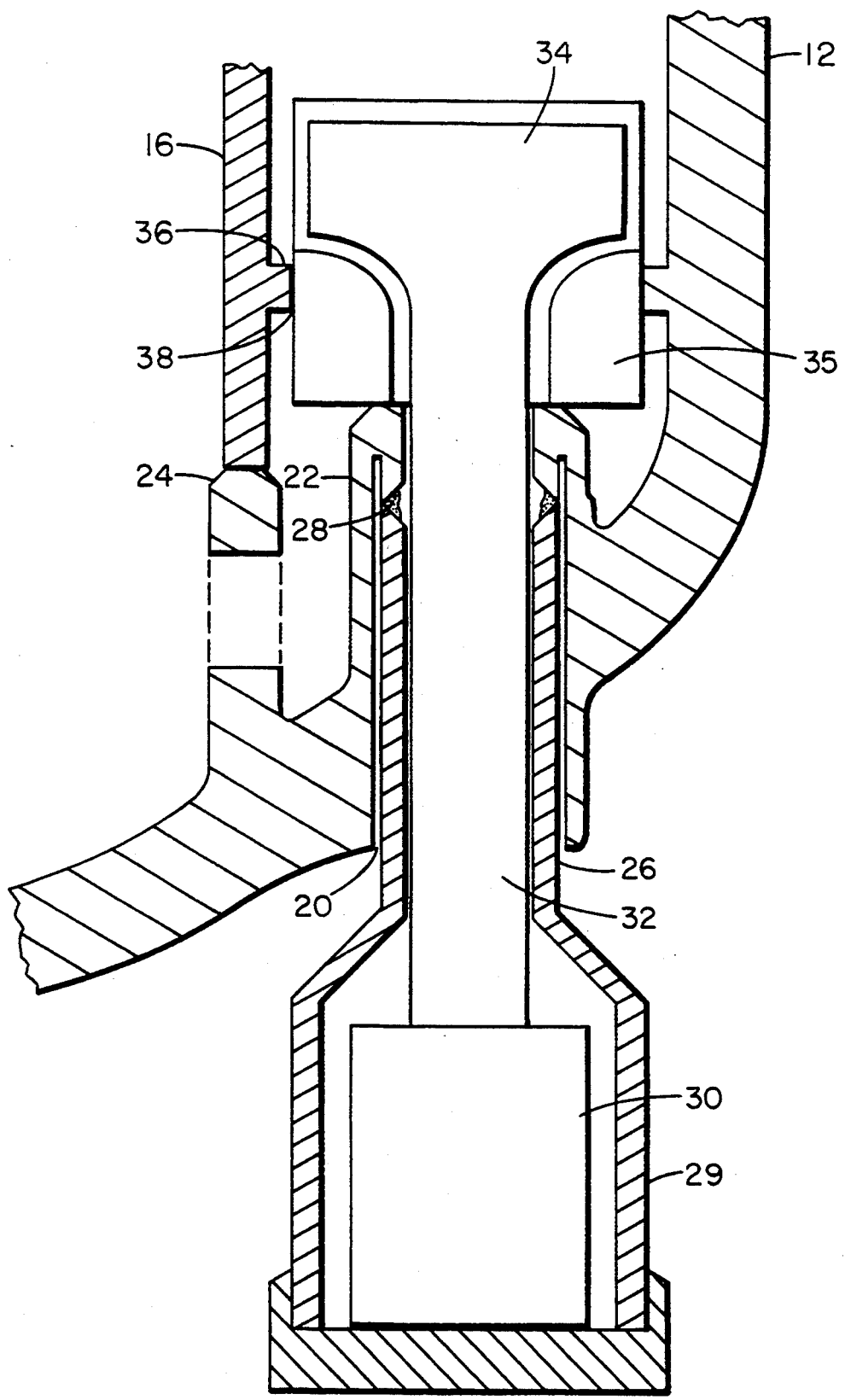
FIG. 2 comprises a partial sectional view of a lower portion of the nuclear reactor pressure vessel of FIG. 1 illustrating in detail the arrangement of a coolant water circulating pump in the lower portion of the vessel.

One category of boiling water nuclear fission reactor plants 10 employ coolant water circulating pumps comprising a multiplicity of impellers positioned in a generally circular arrangement around the inside bottom of the reactor pressure vessel 12 and connected by means of drive shafts passing through the pressure vessel to externally mounted drive motors, as shown in FIG. 1 and 2. Typically with such a coolant circulating pump arrangement, bore openings 20 are provided in the lower portion of the reactor pressure vessel 12 having a tube-like section 22, or hollow cylindrical stub, extending inward and upward around the bore openings. The bore openings 20 and the adjoining inward tube sections 22 are generally located in the curved bottom of the pressure vessel 12 in an annular peripheral area between the pressure vessel side wall and a core shroud support 24.

In conjunction with an arrangement for coolant water circulating pumps, a hollow cylindrical housing 26 is located concentrically upward into each pressure vessel bore opening 20 and the adjoining inward tube section 22 and thus positioned fixed by a weld 28 around its upper annular end to the surrounding tube section 22.

A portion of the hollow cylindrical housing 26 projecting outward and downward from the reactor pressure vessel 12 supports a drive motor casing 29, which provides an enclosure for the electrical motor 30. Enclosed within the hollow cylindrical housing 26 is a drive shaft 32 extending from the motor 30 through the reactor pressure vessel bore opening 20 to a pump impeller 34 positioned within the diffuser 35 in an opening in the pump deck 36 within the lower portion of the reactor pressure vessel 12. Thus arranged, the motor driven pump impellers positioned in the opening 38 through pump deck 36 and spaced around the lower portion of the reactor pressure vessel 12 draw coolant water downward within the annular downcomer area outside of the fuel core shroud 16 and force the coolant water below the core shroud 16 then up through the heat producing fuel core 14. This circulation of coolant water is continuously repeated with the loss due to evaporation into steam of a portion of the liquid coolant water being made up by recycled steam condensation returned from performing work such as driving a turbine.

The substantially continuous operation of such nuclear reactor coolant water circulation pumps over prolonged periods of time within an environment of radiation, high temperatures and pressures, and vibrations, creates a need for providing routine periodic maintenance inspections and/or service of the pump components. For example, it may be necessary to repair weld the annular end of the hollow cylindrical housing 26 and the surrounding tube-like section 22 or stub extending from the bore opening 20 in the pressure vessel 12 or to replace or recondition the weld 28 which may be fractured or fatigued.

Since the nuclear reactor pressure vessel 12 is substantially filled with coolant water 18 for submerging the heat producing fuel core 14 and carrying away the produced heat by routine circulation of the coolant water, maintenance service or repairs for such coolant water circulating pump components must be carried out without removing or substantially reducing the water contents of the reactor pressure vessel 12.

In accordance with this invention a unique self-aligning sealing system 40 is provided which can be installed from overhead extending down through the substantial depth of the pool of coolant water contained within the reactor pressure vessel 12, following removal of the pump impeller 34 from the drive shaft 32 and the diffuser 35 from overhead. Thus with the novel sealing means of the invention, maintenance personnel, after removal of the reactor pressure vessel top head and steam dryer, operating from above with remote underwater tools, lift away the pump impeller 34 and the diffuser 35 and then apply the self-aligning seal of system 40 to the upper end of the tube-like section 22 or stub projecting inward and up from the reactor pressure vessel 12 bore opening 20.

The self-aligning sealing system 40 for boiling water, nuclear fission reactor plants 10 of this invention utilized in carrying out maintenance service of submerged coolant water circulating pumps, as shown in FIGS. 3 and 4, includes the following components. This system 40 comprises a cylindrical seal unit 42 having an elongated side wall 44 and open bottom with a tapered inward projecting flange 46 containing a seal for abutting with and closing off the upper circular open end of the tube-like section 22 or stub projecting inward and up from the reactor pressure vessel 12 bore opening 20. The cylindrical seal unit 42 has a closed top 48 provided with a central upward projecting shaft 50 having a knob 52 on the upper end for gripping and handing under water by means of a remote handling device such as a pole or other device with an end grip for grasping and releasing the knob 50. Preferably a collar flange 54 acting as a stop member is provided on the shaft 50 between the cylinder closed top 48 and the knob 52 as illustrated. Additionally the cylindrical seal unit, 42 is provided with a multiplicity of generally equally spaced, or symmetrically arranged vertical grooves 56, providing guide members, in the external side wall of the cylindrical unit extending downward from the closed top 48. For example, at least three equally spaced symmetrical grooves 56 extending down the side wall 44 of the cylindrical seal unit 42 is preferred.

This self-aligning seal system 40 additionally comprises a seal guide member 58, as shown in FIG. 5, having a generally horizontal disk top 60 of slightly large diameter than the closed top 48 of the cylindrical seal unit 42, and is provided with a central opening 62. Opening 62 is of adequate diameter to receive passing therethrough the shaft 84 and knob 52 projecting upward from the closed top 48 of the cylindrical seal unit 42, but of a smaller diameter than the collar flange 54 thereby providing a stop to prevent traversal therethrough after the seal guide member 58 has been mounted on cylindrical seal unit 42 and the collar flange 54 installed on shaft 50. Disk top 60 of the seal guide member 58 is provided with a multiplicity of depending legs 64 generally equally spaced, or symmetrically arranged and extending down the top disk 60. The depending legs 64 of the seal guide member 58 are spaced around the top disk 60 in an alignment corresponding in position with the vertical grooves 56 in the side wall 44 of cylindrical seal unit 42, and are of a configuration which will closely mate with the vertical grooves 56. The legs 64 are tapered 66 on their outermost surface inward from the top disk 60 down towards their lower end.

The seal guide member 58 is designed and constructed to fit down over the cylindrical seal unit 42 with the central opening 62 of the disk top 60 of the guide member 58 passing around the shaft 84 and knob 52 of seal unit 42 and resting superimposed upon the closed top 48 of the seal unit 42. Additionally, the legs 64 depending down from the disk top 60 of guide member 58 with their downward and inward tapered outer face 66, which are in corresponding number, position and cross-sectional configuration with the grooves 56 in the side wall 44 of the cylindrical seal unit 42, mate within and slide down within the grooves 56 to form a composite self-aligning seal system 40. The collar flange stop 54 is installed on the shaft 84 above the top disk 60 of the seal guide member 58 following assembly of the member over and embracing the cylindrical seal unit 42 within the top disk 60 and depending legs 64.

The tapered legs 64 depending from the top disk 60 of the seal guide member 58 are of a greater circumference around their outer periphery adjacent to the disk top 60 than the circumference of the cylindrical seal unit 42 whereby they each project radially outward from its respective mating groove 56 adjacent to the upper portion of the cylindrical seal unit 42, and its closed top. From their upper projections the legs 64 fit into the vertical grooves 56 taper downward and inward at least to the outer surface of cylindrical side wall 44 and its circumference. This arrangement provides a wedge shaped configuration which is self-aligning upon moving downward into an opening such as the opening 38 in the pump deck 36.

Thus arranged or assembled, the composite seal system 40, can be gripped by means of the knob handle 52 with a remote operating machine and manipulated by personnel from overhead deep down within a reactor pressure vessel 12 under water to a position just above a diffuser 35 opening 38 in the pump deck 36 and the open annular end of the tube-like section 22, or stub, extending up around a bore opening 20 in the bottom of the reactor pressure vessel 12. With the pump impeller 34 and diffuser 35 removed, the tapered legs 64 guide and center the cylindrical seal unit 42 down within an opening 38 in the pump deck 36 and in turn the concentrically underlying annular end of the tube-like section 22 or stub until the inward projecting flange 46 of the cylindrical seal unit 42 adjoins the annular upper end of the tube-like section 22 or stub, sealing off same against coolant water loss therethrough when components such as the drive motor 30 and drive shaft 32 are to be removed from below for any need maintenance service in a dry field or environment.

What is claimed is:

1. A self-aligning seal system for maintenance service of a generally vertical aligned cylindrical housing extending upward passing through the lower portion of a nuclear reactor plant pressure vessel for embracing a rotatable shaft connecting an external motor to an internal coolant circulating pump impeller;

said self-aligning seal system comprising the combination of:
   a cylindrical seal unit having an open bottom with a tapered inward projecting flange for sealing the generally vertical aligned cylindrical housing from loss of coolant water retained within the pressure vessel and a closed top having a central projecting knob for handling, said cylindrical seal unit being provided with a multiplicity of generally equally spaced vertical grooves in the external side of the cylindrical unit extending downward from the closed top;
   a seal guide member comprising a generally horizontal disk having a central opening for receiving passing therethrough of the central knob of the cylindrical seal unit, and extending down from the disk a multiplicity of legs in generally equally spaced alignment corresponding with and of a configuration mating with the vertical grooves of the cylindrical seal units, the legs of the guide member being tapered on their outermost surface inward from the disk to their lower ends,
   said seal guide member being mounted over the closed top of the cylindrical seal unit with the disk resting on the closed top of the seal unit with the knob passing through the central opening of the guide member disk, and the downward extending inward tapered legs of the seal guide member extending in mating relationship within the vertical grooves of the cylindrical seal unit with an upper portion of the tapered legs projecting out beyond the side of the cylindrical seal unit and sloping inward therefrom to at least becoming flush with the outer surface of the side of the cylindrical seal unit.

2. The self-aligning seal system of claim 1, wherein the seal guide member is provided with at least three downward extending tapered legs.

3. The self-aligning seal system of claim 1, wherein the seal guide member is provided with four downward extending tapered legs.

4. The self-aligning seal system of claim 1, wherein the central knob projecting from the closed top of the cylindrical seal unit is mounted on an extending shaft and provided with a collar stop to preclude the seal guide member from separating from the cylindrical seal unit.

5. A self-aligning seal system for maintenance service of a generally vertical aligned cylindrical support housing extending upward passing through the lower portion of a nuclear reactor plant pressure vessel for embracing and supporting a rotatable drive shaft connecting an external motor to an internal coolant water circulating pump impeller;

said self-aligning seal system comprising the combination of:

a cylindrical seal unit having an open ended bottom with a tapered inward projecting flange for sealing the generally vertical aligned cylindrical support housing from coolant water retained within the pressure vessel leaking out therethrough and a closed circular top having a central upward projecting shaft with a knob for handling and a collar flange stop mounted thereon, said cylindrical seal unit being provided with three generally equally spaced and symmetrical vertical grooves in the external side of the cylindrical seal unit extending downward from the closed circular top;

a seal guide member comprising a generally horizontal disk having a central opening for receiving passage therethrough of the central upward projecting shaft from the circular top of the cylindrical seal unit and supporting the handling knob thereon, and extending down from the disk three legs in generally equally spaced and symmetrical alignment corresponding with and of a configuration mating with the vertical grooves of the cylindrical seal unit, the legs of the seal guide member being tapered on their outermost surface inward from the disk to their lower ends which are flush with the outer face of the cylindrical seal unit;

said seal guide member being mounted over the closed circular top of the cylindrical seal unit with the disk resting on the closed circular top of the cylindrical seal unit with the central upward projecting shaft of the cylindrical seal unit supporting the knob passing up through the central opening of the seal guide member disk, and the downward extending inward tapered three legs of the seal guide member extending in mating relationship within the corresponding three vertical grooves of the cylindrical seal unit with an upper portion of the tapered legs projecting out beyond the side face of the cylindrical seal unit and sloping inward therefrom to at least becoming flush with the outer surface of the side of the cylindrical seal unit.

* * * * *